Patented July 15, 1924.

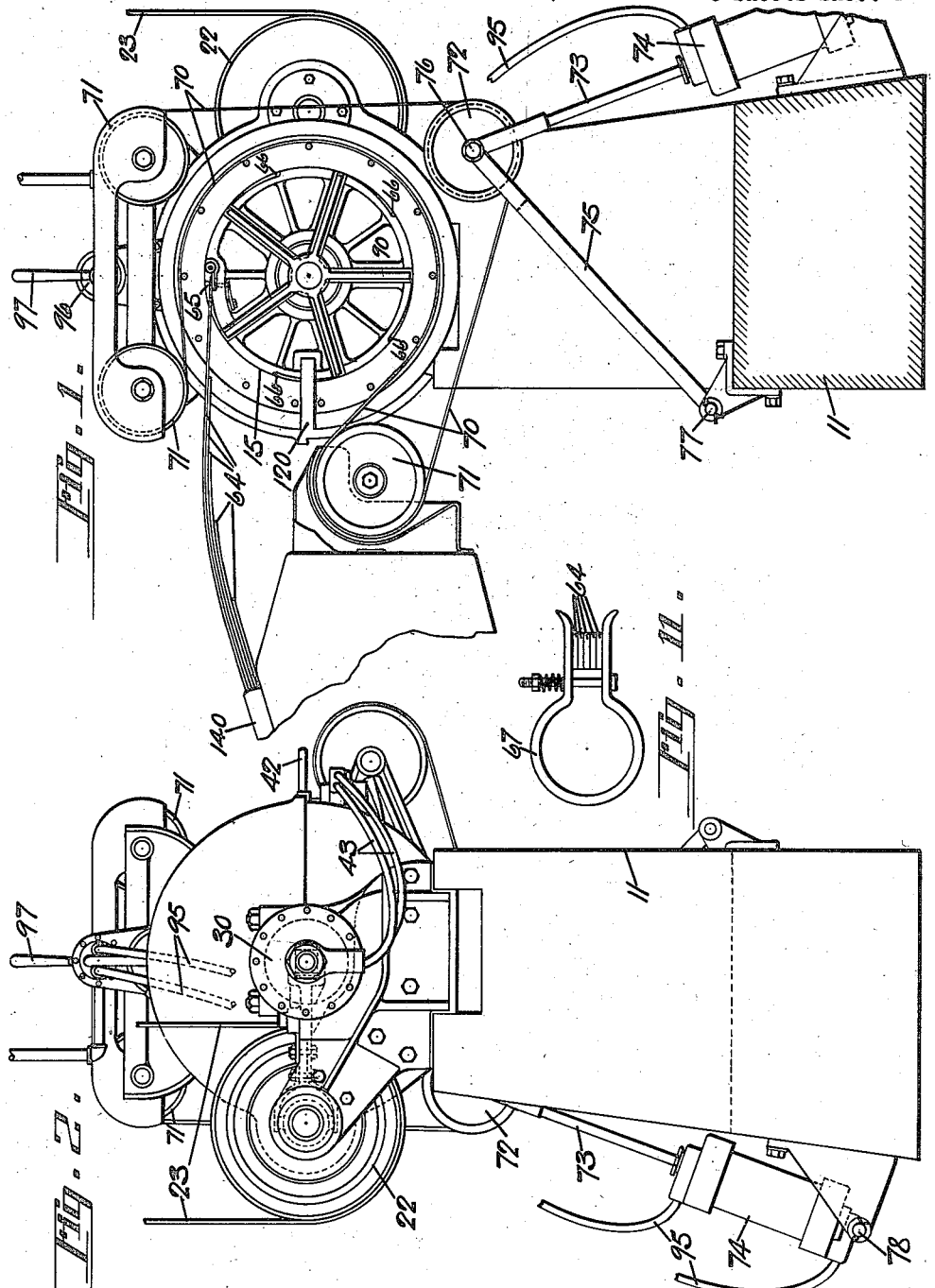

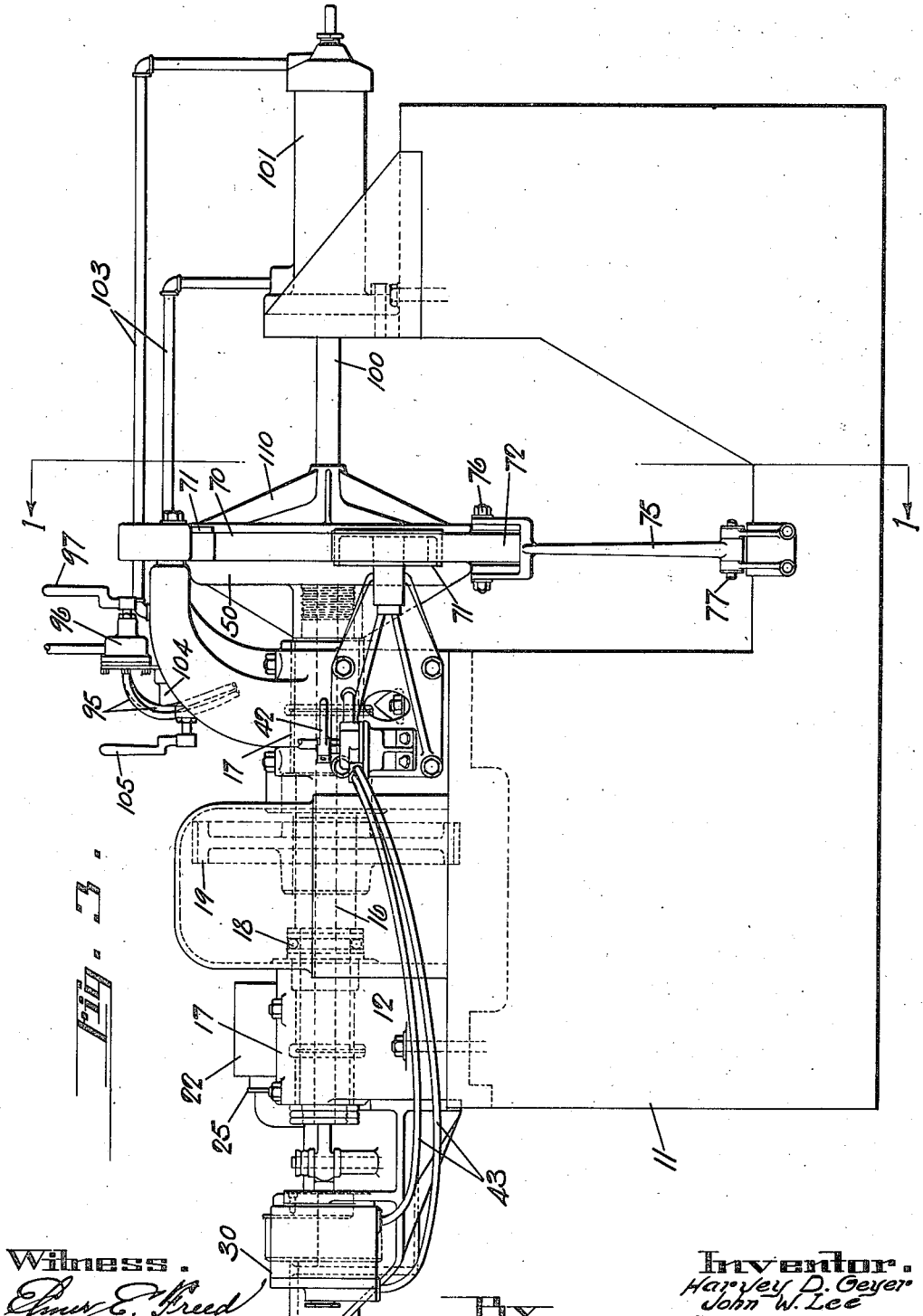

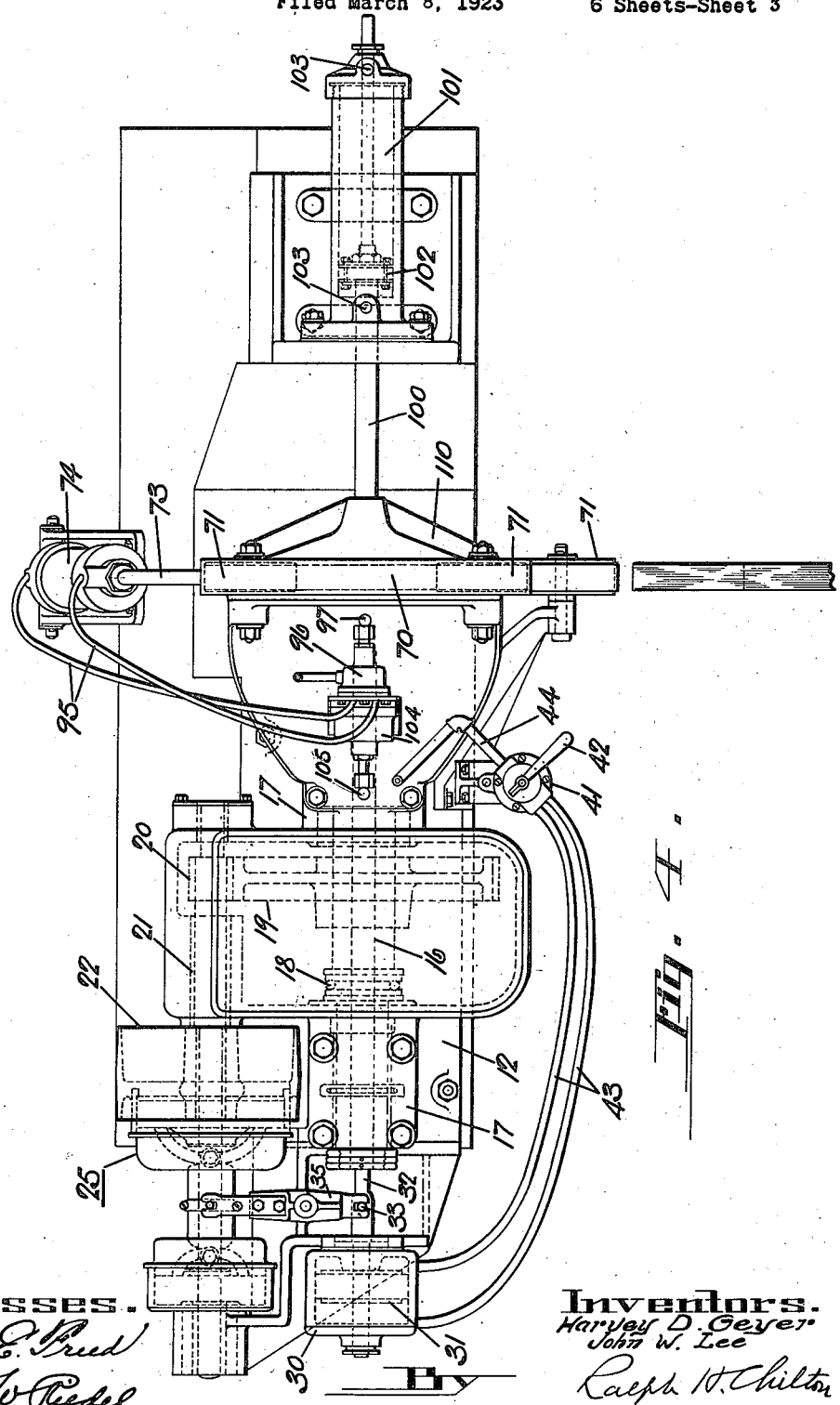

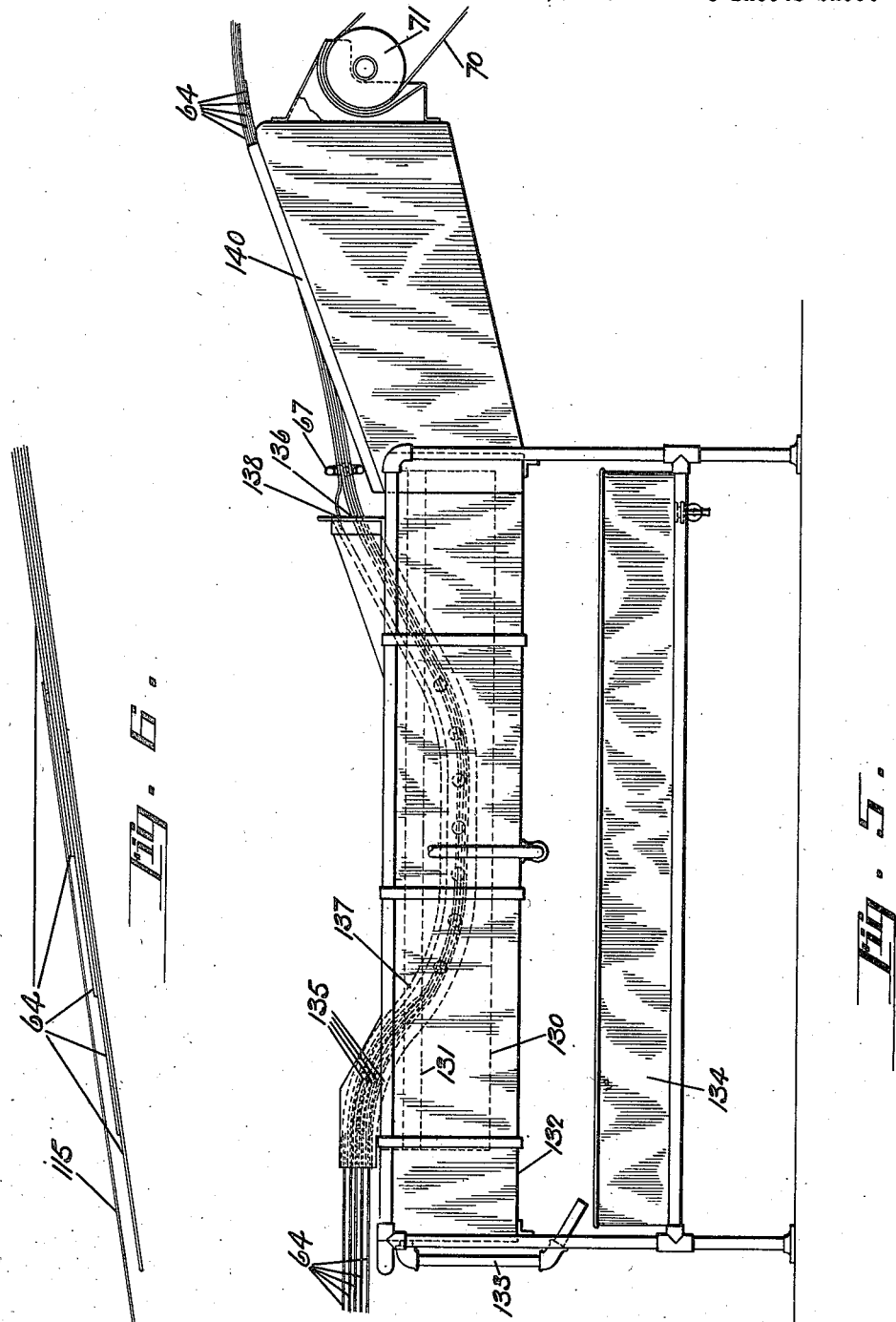

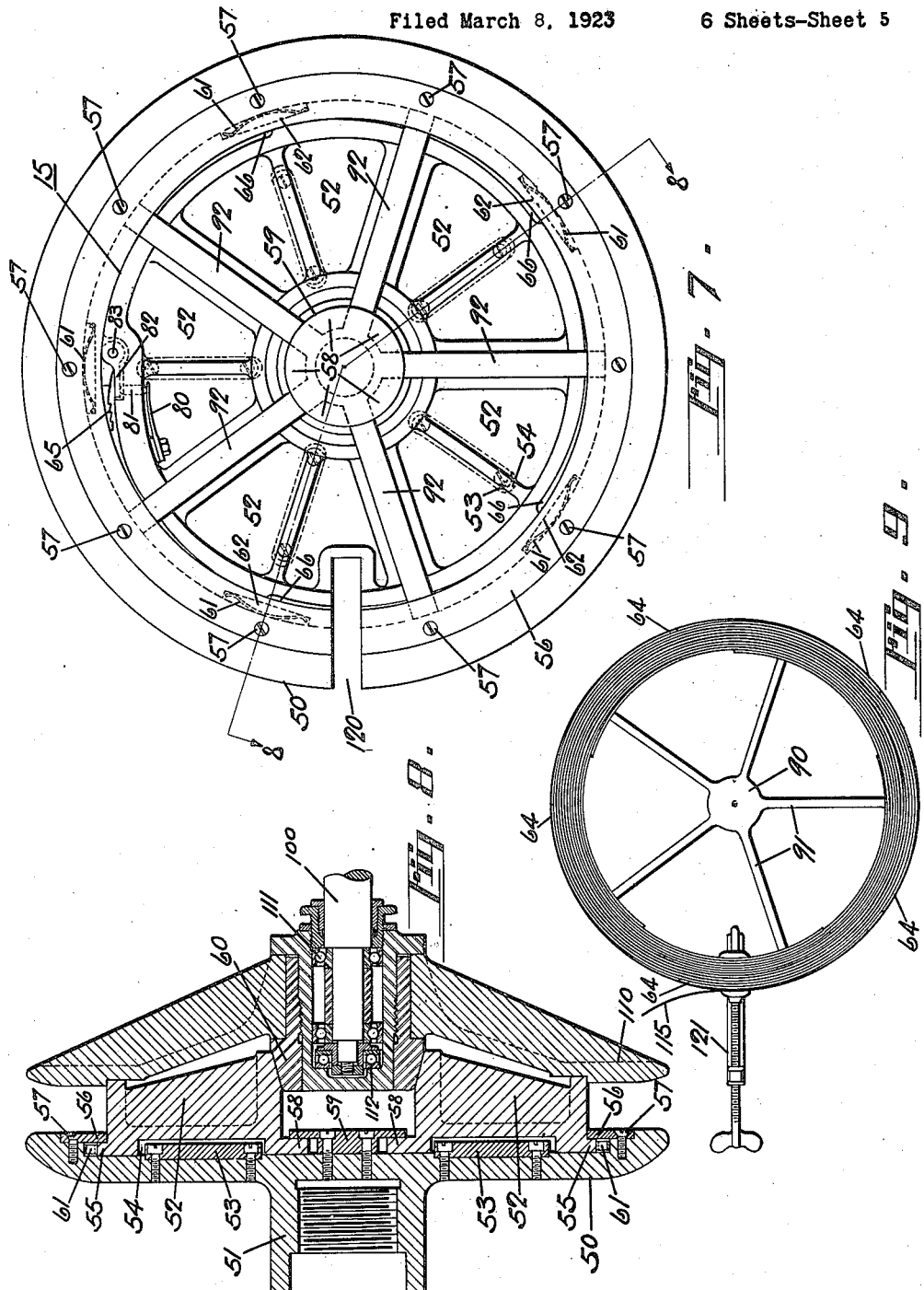

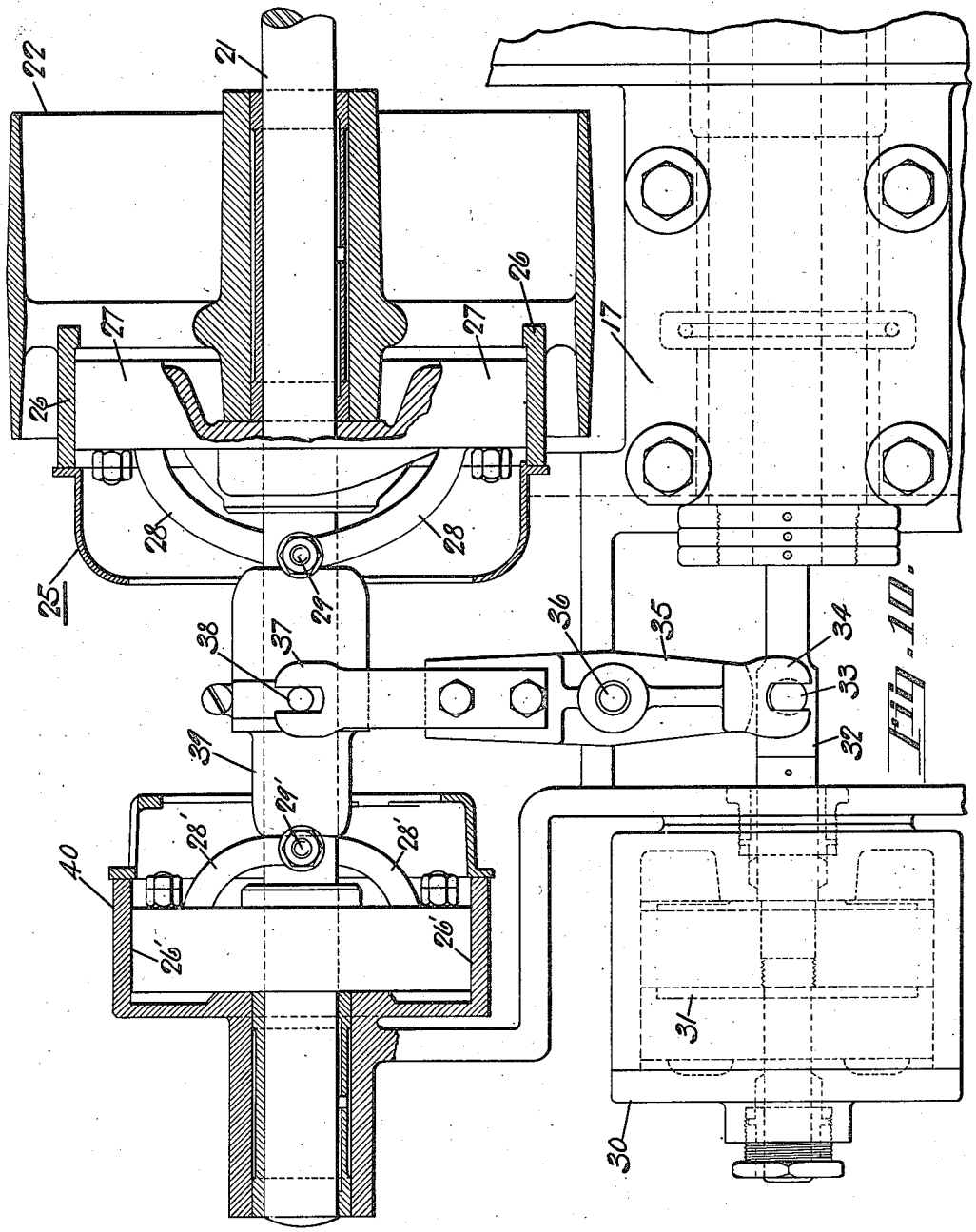

1,501,593

UNITED STATES PATENT OFFICE.

HARVEY D. GEYER AND JOHN W. LEE, OF DAYTON, OHIO, ASSIGNORS TO THE INLAND MANUFACTURING COMPANY, OF DAYTON, OHIO, A CORPORATION OF DELAWARE.

COILED RIM AND METHOD OF MAKING IT.

Application filed March 8, 1923. Serial No. 623,592.

*To all whom it may concern:*

Be it known that we, HARVEY D. GEYER and JOHN W. LEE, citizens of the United States of America, residing at Dayton, county of Montgomery, and State of Ohio, have invented certain new and useful Improvements in Coiled Rims and Method of Making Them, of which the following is a full, clear, and exact description.

This invention relates to an improved method and a machine for carrying out said method of forming a laminated rim from a thin strip or strips of wood or other suitable material, which are glued together and permitted to dry while held in coiled form.

One of the objects of this invention is to provide an improved method of making a laminated rim from a plurality of thin strips of approximately equal length which are glued and coiled together in such manner that each strip extends from the inner periphery to the outer periphery of the rim.

Another object is to provide improved means for retaining the coiled strips in coiled form until the glue has dried sufficiently to hold the same, after which the retaining means may be easily removed and applied to another coil in like manner.

Other objects are to provide an improved machine for coiling such strips having: (1) an expandible winding drum upon which the strips are wound: (2) automatic means for expanding said drum preparatory to starting the winding operation: (3) automatic means for contracting said drum preparatory to removing the wrapped coil: (4) a flexible band positioned around the periphery of said drum and having means to put said band under tension during the wrapping operation to thereby press the strips together as they are coiled upon each other: (5) automatic gripping means on the drum for gripping the foremost strip when the flexible band is put under tension preparatory to starting the wrapping operation: (6) means for the insertion of a spider within slots in said winding drum, said spider being adapted to be removed with the wrapped coil for holding the inner ends of the coiled strips in position until the glue has dried: (7) means for attaching a clamping means to a retaining strap about the coiled rim while the rim is yet upon the winding drum, whereby the coiled rim, inside spider, retaining strap and said clamping means are all removed from the machine as a unit and remain so until the glue has dried sufficiently to hold the coiled strips in coiled form: (8) means for automatically applying glue to said strips as they pass to the winding drum: and (9) braking means for stopping the motion of said winding drum automatically applied when said winding drum is uncoupled from its driving means, and automatically released when said winding drum is again connected to its driving means.

Other objects will appear hereinafter in the more detailed description of the various features of the invention when taken in connection with the drawings wherein a preferred embodiment of the invention has been illustrated which is suitable for coiling a laminated rim for steering wheels.

In the drawings:

Fig. 1 is a view taken on the line 1—1 of Fig. 3 and shows the movable guide disk withdrawn, the spider in place within slots in the winding drum, the wooden strips in position for starting the coiling operation, and the tensioning hand about the drum periphery not yet tightened upon the drum.

Fig. 2 is an end elevation of the machine from the left end of Fig. 3.

Fig. 3 is a side elevation from the left side of Fig. 1, the glue tank and its attached guides for the strips being omitted.

Fig. 4 is a plan view, the glue tank and the attached guides for the strips being omitted.

Fig. 5 is a side elevation of the glue tank and shows the path of the strips therethrough just before they pass to the winding drum.

Fig. 6 shows the rear ends of the strips shown in Fig. 5 and the flexible band attached to the rear end of the topmost strip.

Fig. 7 is an enlarged view of the winding drum as seen in Fig. 1 but with the spider removed from the slots in said drum.

Fig. 8 is a section on line 8—8 of Fig. 7.

Fig. 9 shows a coiled rim with spider and clamping means in place as it is taken from the wrapping machine.

Fig. 10 is a detail view showing on an enlarged scale the clutch and braking mechanism for the power drive for the winding drum.

Fig. 11 is an enlarged view of the spring clamp for holding the strips together while they are being started upon the coiling drum.

In the drawings, similar reference characters refer to similar parts throughout the several views.

The winding drum 15 (see Figs. 1 and 3) is suitably rigidly secured to its driving shaft 16 which is supported in the two main bearings 17. These main bearings 17 are spaced apart far enough to accommodate the thrust bearing 18 therebetween as well as the large driving gear 19 which is suitably keyed to the shaft 16. This gear 19 meshes with the smaller gear 20 keyed upon the shaft 21 (see Fig. 4). The driving pulley 22 upon which the driving belt 23 runs is loosely mounted upon the shaft 21 (see Fig. 10). This pulley 22 may be rigidly secured upon shaft 21 by means of a clutch mechanism indicated in its entirety by numeral 25. This clutch mechanism consists of a friction drum 26 integral with or rigidly secured to the pulley 22 and the expanding clutch members 27 which may be moved radially outward by the links 28 pivoted at 29 to cause the members 27 to frictionally engage the inner surface of the drum 26. Since these members 27 slide radially upon a member which is keyed to shaft 21 it follows that when members 27 are in driving engagement with the clutch drum 26 the pulley 22 will be rigidly fixed upon shaft 21 and hence the driving belt 23 will drive shaft 21 and through the gears 20 and 19 will also drive shaft 16.

The clutch 25 is operated by a double acting compressed air cylinder 30 having a piston 31 therein attached to the reciprocating rod 32. Such air cylinders are well known for the operation of mechanical devices and hence it will not be illustrated and described in detail herein. The rod 32 has a pin 33 thereon which cooperates with the forked end 34 of lever 35 pivoted at 36 to the stationary frame for rocking the lever 35 to and fro as the piston 31 moves to the right or left end of the air cylinder 30. The opposite end of lever 35 has a similar fork 37 which cooperates with the pin 38 on the clutch shifting mechanism for sliding the head 39 to and fro along the extended portion of shaft 21. Since the links 28 are pivoted to the head 39 at the pivot point 29 it will be clear that when the head 39 moves to the right as seen in Fig. 10 the links 28 will act as a toggle to press the friction members 27 tightly against the clutch drum 26. And when the head 39 moves to the left the links 28 will cause the members 27 to disengage the drum 26 and thus release the clutch. The particular type of clutch mechanism described above is no part of the present invention and since such clutch mechanisms are well known in the art it will not be described herein in any great detail. On the opposite side of the head 39 is a brake mechanism indicated in its entirety by numeral 40. This brake mechanism is similar to the clutch mechansm 25 with the exception that the brake drum 26' is stationary with the frame of the machine. It will be obvious from Fig. 10 that when the head 39 moves to the right the brake members will be released from the brake drum 26' and the clutch members 27 will engage the clutch drum 26, and when head 39 moves to the left the brake members will engage the brake drum 26' and the clutch members 27 will disengage the clutch drum 26. Hence as soon as the piston 31 travels to the left end of cylinder 30 the shaft 21 will start turning with the drive pulley 22 and the winding drum 15 will be driven by pulley 22. And as soon as piston 31 travels to the right end of cylinder 30 the shaft 21 will be disengaged from the power means and the brake 40 immediately applied thereafter, to cause the drum 15 to cease turning immediately. An air valve 41 having the handle 42 is conveniently located near the operator of the machine. When handle 42 is in one position compressed air is being supplied from the supply pipe 44 to the cylinder 30 through one of the pipes 43 and exhausted through the other, and hence piston 31 will move quickly to operate the clutch and brake mechanisms in the manner desired. For the reverse motion of these mechanisms it is simply necessary to throw the handle 42 to a second position to admit compressed air to the other end of cylinder 30 and exhaust the opposite end thereof.

The winding drum 15 is shown in detail in Figs. 7 and 8. A casting 50 has a suitable hub 51 thereon for attaching the same rigidly to shaft 16. This casting 50 serves as a base plate for the five sectors 52 of the drum proper. Each of these sectors 52 is splined upon the casting 50 by the radial splines 53 fixed to the casting 50 and the radial slots 54 at the center of each of the sectors 52. It will be noted that the slots 54 are only slightly longer than the splines 53 and therefore permit only a slight radial movement of each of the sectors 52 upon the face of the casting 50. The sectors 52 are provided at their outer periphery with the flange portions 55 which extend beneath the annular ring 56 which is rigidly fixed to casting 50 by the screws 57. The sectors 52 are also provided at their inner periphery with the flange portions 58 which extend beneath the flanged disk 59 fixed at the center of casting 50. In Fig. 8 the sectors 52 are shown at their expanded position. It will be noted that their inner flanges 58 have a sufficient clearance from the member 59 to permit a small movement toward the center by each of the sectors 52. When the expanding cone 60 is withdrawn (as will be described in detail herein) each of the sectors 52 is moved inwardly toward the center by the small springs 61 which are located in recesses 62 cut in the periphery of the flanges 55 as clearly illustrated in Figs. 7 and 8. When the sectors 52 are expanded by the cone 60 these springs 61 are compressed and hence when cone 60 is withdrawn they act to contract the sectors 52 toward the center. Of course it is clear that the outer periphery of all five of the sectors 52 form the winding drum which has been given the reference numeral 15.

Fig. 1 shows clearly the manner in which the strips 64 of wood are piled on top of each other and fed to the winding drum 15. A gripping means 65 is provided for gripping the end of the topmost strip to pull it over the winding drum 15 when it begins to wind. The remaining lower strips are all clamped to the top strip by means of a small hand clamp 67 shown clearly in Fig. 11. When the bottommost strip has started to wind on the drum 15 this clamp 67 is snatched off the strips by the operator, after which all the strips are wound together upon the drum 15 to form the laminated rim. When five strips 64 are used (as in the case illustrated) five recesses 66 of the shape most clearly shown in Fig. 7 are equally spaced around the periphery of drum 15 to receive the ends of the five strips as they are wound upon the drum. By this means it is seen that the strips are coiled in a perfect circle except for the short ends projecting into the recesses 66. Therefore there will be substantially uniform pressure between the strips around the coil, which uniform pressure causes a uniform distribution of the glue between the strips and a uniformly strong glued joint throughout the entire coiled rim after the glue has dried. If the inner ends of the strips are not set in such recesses but coiled upon a smooth drum these inner ends will form small humps in the coil and at these humps of course the pressure between the strips will be greater than at points between the humps. This of course will cause an uneven distribution of the glue around the coil and give either too much glue at some points or not enough at other points and consequently a very imperfect glued joint throughout the coil. It has been found that with some woods it is practically impossible to get a perfect glued joint throughout the entire coil unless such a uniform distribution of pressure around the coil is obtained.

In order to further increase the pressure between the strips as they are being coiled up an endless flexible belt or band 70 is provided which runs over the stationary pulleys 71 and movable pulley 72 as clearly shown in Fig. 1. The pulley 72 is pivoted upon the end of the piston rod 73 of the compressed air cylinder 74 and is movable up and down by means of the air cylinder 74. Its path of motion is further guided by the link 75 which is likewise pivoted to the end of piston rod 73 at 76 and at the stationary pivot 77. The lower end of the cylinder 74 is pivoted at the stationary pivot 78 to permit the angularity of the rod 73 to vary as compelled by the rigid link 75 when pulley 72 moves up or down. In Fig. 1 the pulley 72 is shown in its up position and hence the belt 70 is loose leaving a space between the belt and the winding drum 15. When pulley 72 moves to its down position of course the belt 70 is tightened until it presses tightly against the drum 15 as will be readily understood. The gripping flap 65 (see Fig. 7) is so designed that it is held up or in its open position by the spring 80 acting through the short pin 81 whose top bears against the short arm 82 which is integral with the flap 65. The flap 65 is pivoted at 83. Of course any other spring means for holding flap 65 normally raised may be used if desired, as only one simple form has been illustrated. When the belt 70 is tightened upon drum 15 it presses upon the top of flap 65 and presses it in against the action of the relatively weak spring 80 and so causes the flap 65 to grip the end of the top strip which will have been placed under the flap 65.

Before beginning the coiling operation a spider 90 having five spokes 91 (see Fig. 9) is inserted within the spaces 92 between the sectors 52 which compose the winding drum 15. Fig. 1 shows this spider 90 in position in the drum 15. It will be noticed that the recess 66 in the drum 15 is so positioned relative to the ends of the spider spokes 91 that when the coil and spider are removed from the winding drum the spider spokes press against the inner periphery of the coil a short distance from the ends of the strips 64. After the spider 90 is in place the strips 64 are passed through the glue tank as will be later described herein and their forward ends arranged as shown in Fig. 1 so that as the strips are coiled upon the drum 15 the ends of the strips will fall severally into the recesses 66. The end of the topmost strip is passed under the raised gripping means 65 and the hand clamp 67 placed on all the strips to hold them together so that they will all be fed into the wrapping machine in the desired relative positions.

The drum 15 is next expanded by means of the expanding cone 60 which is rotatably mounted upon the rod 100 (see Fig. 8). This rod 100 is shiftable toward or away from the drum 15 by means of a long double acting air cylinder 101 having a piston 102 therein. The rod 100 preferably has an extension on the opposite side of the piston 102 (as shown in dotted lines in Fig. 4) so that it may have a guiding bearing at both ends of cylinder 101 for obvious reasons. Compressed air may be admitted into one end of cylinder 101 and exhausted from the other through the pipes 103 (see Fig. 3) leading to the control valve 104 which has the control lever 105 located in convenient position for the operator. Also rotatably mounted upon the end of the rod 100 is the guiding disk 110 which acts as a guide on one side of the coil as the strips are being coiled. This guide disk 110 and the expanding cone 60 may conveniently be rigidly secured together (as shown clearly in Fig. 8) and the two mounted as a unit upon the shaft 100 by means of the ball bearing 111 and the thrust bearing 112. Thus it is clear that when the air cylinder piston 102 moves to the left as seen in Figs. 3 or 4, the cone 60 will engage the conical surface of each of the sectors 52 and press them outward against the action of the springs 61, thereby increasing the diameter of the winding drum 15. When the winding drum is fully expanded the guide disk 110 abuts the side of the drum 15 which therefore acts as a stop for the expanding motion of the sectors 52.

The air cylinder 74 has a double acting piston therein and compressed air may be admitted into one end and exhausted from the other through the air hose 95 leading to the control valve 96 which has a control lever 97 located in convenient position for the operator. After the cone 70 and disk 110 have been moved adjacent the drum 15, the control handle 97 is turned to the position to admit compressed air to the upper portion of the air cylinder 74 which of course immediately moves the pulley 72 downward and draws the belt 70 tightly around the drum 15 and causes the gripping means 65 to seize the end of the top strip 64, all as clearly described heretofore. Power from the belt 23 is now applied to rotate the drum 15 by the operator turning the control handle 42 to the position to release the brake 40 and engage the clutch 25 as described above. As soon as the bottommost strip 64 begins winding on drum 15, the operator pulls the hand clamp 67 off and permits all the strips 64 to be wound up on the drum 15. Of course as the thickness of the coil on the drum increases the belt 70 pulls the pulley 72 upward, however a constant pressure is maintained in the cylinder 74 throughout the whole winding of the coil in order to maintain a uniform pressure between the belt 70 and the coil at all times. The amount of pressure to give the best results with different thicknesses of strips 64, or with different kinds of wood, may be easily adjusted simply by regulating the air pressure admitted to cylinder 74 such as by a pressure reducing valve or other well known means.

The rear end of the topmost strip 64 has a flexible metallic band 115 fastened thereto by a number of short brads or by other suitable means. Preferably these brads are welded to the band 115 so that they are held in place when the band is detached from the strip 64 and therefore facilitates the attachment of the bands 115 to the strips 64. It will be obvious that when the strips 64 are completely wound upon the drum 15 the band 115 will be wound around the outside of all the rear ends of the strips 64. The power is now disconnected and the braking means applied. The control handle 105 is next turned to the position to admit air to the left side of the piston 102 as seen in Fig. 4 and therefore the disk 110 and cone 60, are moved over to the right the desired distance to permit the easy removal of the coil from the drum 15. Of course when the cone 60 is withdrawn the sectors 52 are moved toward the center by the springs 61, and hence the coil will now be loose upon the drum 15. The casting 50 and also the drum 15 are provided with a slot 120, as shown in Fig. 7, in order to permit a D-clamp such as that shown at 121 in Fig. 9 to be withdrawn therethrough after it has been clamped upon the coiled rim. The operator when stopping the rotation of the drum 15 takes care to stop it when the slot 120 is in position free of the belt 70, such as shown in Fig. 1. The clamp 121 may now be inserted through the slot 120 and clamped over the coiled rim while the belt 70 is yet in tightened position. The flexible band 115 wrapped around the outside of the wood strips laps over upon itself a distance at least sufficient to accommodate the clamp 121. Therefore when the clamp 121 has been securely attached as shown and described the band 115 will hold all the outer ends of the strips 64 tightly coiled after removal from the wrapping machine. The operator next moves the control handle 97 to admit air in the lower part of cylinder 74 and thus move pulley 72 upward, thereby loosening the belt 70 about the coiled rim. When the drum 15 was contracted upon the withdrawal of cone 60 the spider 90, which is set loosely within the spaces between the sectors 52 and whose outer tips were substantially flush with the periphery of the drum when in expanded position, took all of the radial pressure of the coil and hence is held in place within the coil by this pressure. The coil, now held together by the band 115 and clamp 121 and the spider 90, may now be removed from the winding drum as a unit, as will be readily understood. This unit, as shown in Fig. 9, is then hung up until the glue has dried sufficiently after which the spider 90 is removed by pressing it out axially, the clamp 121 removed and the band 115 pulled off for use on another coil. The glue will not adhere very strongly to the metallic band 115 and it has been found to be quite easily pulled off even after the glue has dried sufficiently to firmly hold the strips 64 coiled up.

The glue tank shown in Fig. 5 will now be described. The tank 130 is kept filled with heated glue to approximately the level 131. Surrounding the tank 130 is the hot water tank 132 to which hot water or steam is passed to keep the glue in tank 130 at the desired temperature at all times. The pipe 133 takes care of the overflow from tank 132 into the overflow tank 134 below. The four lower strips 64 are passed down below the surface of the glue through guides 135 which separate the strips so glue will have free access to both sides of each strip and then out at the other end 136 of the guiding channel. The top strip 64 is passed parallel to the other strips but through a closed channel 137 and hence does not have access to the glue in tank 130. However, at 138 the top strip passes out of the closed channel 137 and comes in contact with the glued surface of the next strip below which at this point is dripping wet with glue. Thus it is seen that the top strip has no glue applied on its top surface and so when it is coiled upon the winding drum the belt 70 will not have glue applied thereto. In a modified form of winding machine the tensioning strap 70 instead of being a running endless belt, as illustrated, may be stationary so that the top strip 64 will slide over the surface of the strap 70. If such a modification is used the advantage of having no glue on top of the top strip 64 is great since the friction between the top strip and the strap 70 is thereby greatly reduced. The guiding trough 140 guides the strips 64 to a point near the drum 15 where the operator takes hold of them and places the top strip in the gripping device 65 as previously described. The hand clamp 67 may be applied to the strips at some point along the trough 140 before the drum 15 begins to revolve. This clamp 67 is preferably such that it may be quickly applied or removed with one hand simply by pressing it on or pulling it off from the side of the strips, as clearly shown in Fig. 11.

It will be obvious that the laminated rim made in the manner described will have each strip extending from the inner periphery to the outer periphery and hence there will be no free ends or joints within the body of the coil itself. It is therefore not necessary to taper off the ends of any of the strips to a feather edge or to make any joint between two ends of any strips. The laminated rim thus formed may now be cut down to a round, oval, or any desired section for use as a handwheel rim. Such shaping operations are well known in the art, however we have described in our copending application, Serial No. 529,914, one method of shaping up such rims. By this method the ends of the strips on the inner and outer peripheries of the coil will be feathered down very finely and become practically invisible. A handwheel rim will then be obtained which is absolutely without any semblance of a joint therein and whose wood grain runs circular with the rim. Such rims have been found to be very strong and of good appearance on account of the circular wood grain and the absence of joints.

While the form of embodiment as herein disclosed constitutes a preferred form, it is to be understood that other forms might be adopted, all coming within the scope of the claims which follow.

What we claim is as follows:

1. The method of making a laminated rim including arranging a plurality of relatively thin strips of fibrous material one on top the other but with their ends spaced apart an appreciable distance, applying glue or the like to said strips, coiling a flexible band around the outer periphery of the coil thus formed and securing it in place to prevent the strips from unwinding, allowing the glue to dry sufficiently and then removing the flexible band from the coil.

2. The method of making a laminated rim including arranging a plurality of thin strips of fibrous material of approximately equal lengths one on top the other but with their ends spaced apart in progressive order, attaching one end of a flexible band to the rear end of the topmost strip; applying glue to said strips, coiling said strips simultaneously about a central form until said flexible band has been wrapped about the periphery of the coil thus formed, securing the flexible band to the coil to prevent the coil from unwinding, allowing the glue to dry, and then removing the flexible band and its securing means from the dried coil.

3. The method of making a laminated rim including, arranging a plurality of relatively thin strips of fibrous material one on top the other but with their ends spaced apart an appreciable distance, applying glue or the like to said strips but keeping the top surface of the topmost strip free of glue, coiling all of said strips simultaneously about a central form, clamping the outer ends of the strips to the coil thus formed to prevent unwinding before the glue dries, allowing the glue to dry, and then removing the clamping means.

4. The method of making a laminated rim including, arranging a plurality of thin strips of wood one on top the other but with their front ends spaced apart in progressive order, attaching one end of a flexible band to the rear end of the topmost strip, applying glue to said strips but keeping the top surface of the topmost strip and flexible band free of glue, coiling said strips simultaneously about a central form until the flexible band has been wrapped about the periphery of the coil thus formed, securing the flexible band around the coil to hold the same from unwinding while drying, allowing the glue to dry and then removing the flexible band.

5. A laminated rim composed of a plurality of thin strips coiled upon each other, each strip extending from the inner periphery to the outer periphery of the rim.

6. A laminated rim composed of a plurality of thin strips coiled upon each other, each strip extending from the inner periphery to the outer periphery of the rim, the ends of the said strips being approximately equally spaced around said outer periphery.

7. A laminated rim comprising a plurality of thin strips of fibrous material coiled upon each other, each strip extending from the inner periphery of the rim to its outer periphery, the ends of said strips being spaced around the inner periphery, whereby both ends of said strips may be cut down to a feather edge when the rim section is cut down.

In testimony whereof we hereto affix our signatures.

HARVEY D. GEYER.
JOHN W. LEE.

Witnesses:
ELMER E. FREED,
WM. P. PASCO.